(12) United States Patent
Schott et al.

(10) Patent No.: US 6,359,972 B1
(45) Date of Patent: Mar. 19, 2002

(54) LINE IN USE DETECTION

(75) Inventors: Russell Brian Schott, Irvine; Stanton C. Renna, Costa Mesa; Raphael Rahamim, Orange; Robert W. Frankland, Laguna Hills, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,368

(22) Filed: Sep. 30, 1999

(51) Int. Cl.[7] .................................. H04M 11/00
(52) U.S. Cl. .................. 379/93.01; 379/93.05; 379/93.28
(58) Field of Search ................ 379/93.05, 93.09, 379/93.01, 93.26, 106.03, 142, 373, 377, 399, 93.28

(56) References Cited

U.S. PATENT DOCUMENTS

| | | | |
|---|---|---|---|
| 5,140,631 A | * | 8/1992 | Sathl ........................ 379/377 |
| 5,481,606 A | | 1/1996 | Andrieu et al. |
| 5,737,405 A | | 4/1998 | Dezonno |
| 5,764,694 A | | 6/1998 | Rahamim et al. |
| 5,790,635 A | | 8/1998 | Dezonno |
| 5,790,656 A | | 8/1998 | Rahamim et al. |
| 5,867,560 A | | 2/1999 | Frankland |

* cited by examiner

*Primary Examiner*—Huyen Le
*Assistant Examiner*—Melur Ramakrishnaiah
(74) *Attorney, Agent, or Firm*—Akin, Gump, Strauss, Hauer & Feld, L.L.P.

(57) ABSTRACT

An apparatus and method for ascertaining states of a telephone line. A communication device, such as a modem, is coupled to a telephone line that also has other communication device or devices coupled to the line. The state of the line is determined before the modem goes off-hook. An energy level of a capacitor that is coupled to the telephone line is ascertained by a data pump of the modem. Should the energy level of the capacitor exceed a threshold, then the telephone line is in use and the modem does not go off-hook. If the energy level is at or below the threshold level, then the modem goes off-hook. In another implementation, an energy profile is established for the other communication devices when they transition from an on hook state to an off hook state and vise versa. The energy profile can be detected by the data pump to ascertain the state of the telephone line or the state of the communication device. The disclosed technique provides an elegant way of ascertaining the state of the telephone line without the addition of hardware. By ascertaining the state of the telephone line, the modem can avoid interfering with the other communication devices on the telephone line.

13 Claims, 9 Drawing Sheets

LINE IN USE DETECTION

BACKGROUND

1. Field of the Invention

The present invention relates to an apparatus for communication devices, in particular an apparatus for providing a line status of a phone line.

2. Description of the Related Art

Modems are communications devices that employ digital processing techniques to transmit data over a band-limited communications channel, such as the Public Switched Telephone Network (PSTN). Generally, to transmit data over the PSTN, a modem modulates the binary data and then transmits the data over the band-limited communications channel. A receiving modem is coupled to the band-limited communications channel, and receives the binary data and demodulates the binary data.

The modem can also be coupled to a private network. The private network can operate as a stand-alone network or be further coupled to other networks, such as the PSTN. The private network, such as a Public Branch Exchange (PBX) system can include many users, such as telephones, facsimile machines, etc. When the modem needs to initially send or receive data, the modem needs to go to an "off-hook" state.

"Off-hook" refers to a state of the communication device, such as when the communication link between the device and the PSTN is enabled for voice, data communication or network signaling. The term "off-hook" is derived from the original telephone usage in which they refer to the position of the hand set with respect to the cradle of the telephone.

Sometimes the modem and other communication devices such as a telephone (or an extension), facsimile machine, can share a single telephone line. Typically, should the modem need to seize the telephone line, the modem goes off hook. An off hook relay closes coupling the modem to the telephone line. The off hook relay is typically a mechanical relay that adds noise to the line when it opens or closes. Thus, should other communication devices be on line, and the modem goes off hook, the noise added to the line may affect the other communication devices that are currently using the line.

Some modem designs have incorporated opto-couplers, transistors, and capacitors to ascertain the status of the telephone line. However, the addition of these components can drive up the cost of the modem. Furthermore, the communication devices coupled to the PSTN need to meet certain government standards. The Federal Communication Commission (FCC) requires communication devices that are coupled to the PSTN meet certain electrical requirements, which include electrical interface specifications and electromagnetic interference (EMI) requirements. Furthermore, the additional hardware must be designed to meet these requirements which in turn may drive up the cost of the modem, require additional development and testing, and delay entry of the device into the marketplace. Thus, it would not be advantageous to add additional hardware to the modem.

SUMMARY OF THE INVENTION

Briefly, a method and apparatus is disclosed that provides a status of a telephone line for a communication device, such as a modem that may be shared by other communication devices, such as telephone extension, facsimile machine, etc. The apparatus provides the necessary hardware and software for detecting the line status for the communication device.

With the apparatus ascertaining the state of the line, the modem can avoid going off hook when the line is already active. This can in turn prevent the noise generated when going off hook from interfering with the operation of other communication devices coupled to the same line.

An energy level in a caller ID capacitor is monitored by a modem's data pump. Typically, the caller ID capacitor is always coupled to the line, regardless of whether the modem is in an on-hook or off-hook state. In addition, typically the energy level of the caller ID capacitor is very low if none of the other communication devices are transmitting on the line. Should other communication devices be transmitting information on the line, the AC component of the transmission can be detected from the energy level of the caller ID capacitor. The energy level is monitored by the modem's data pump and should this energy level exceed a certain threshold, the modem will determine that the line is in use and not go to the off-hook state.

In another implementation, the modem's data pump monitors the energy level of the telephone line. An energy profile is established for the other communication devices when they transition from an on-hook state to an off hook state and vise versa. When the data pump detects these transitions, the data pump can report the state of these communication devices or report whether the telephone line is in use or not in use.

In another implementation, should the modem need to go off-hook, a timer periodically checks the energy level of the caller ID capacitor. If the timer has not timed out and the energy level of the caller ID capacitor continues to exceed the certain threshold, a command is sent to the modem to avoid going off-hook. However, during the time period, should the energy level of the caller ID capacitor go below the certain threshold, the modem will go off-hook and begin data transmission or reception.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
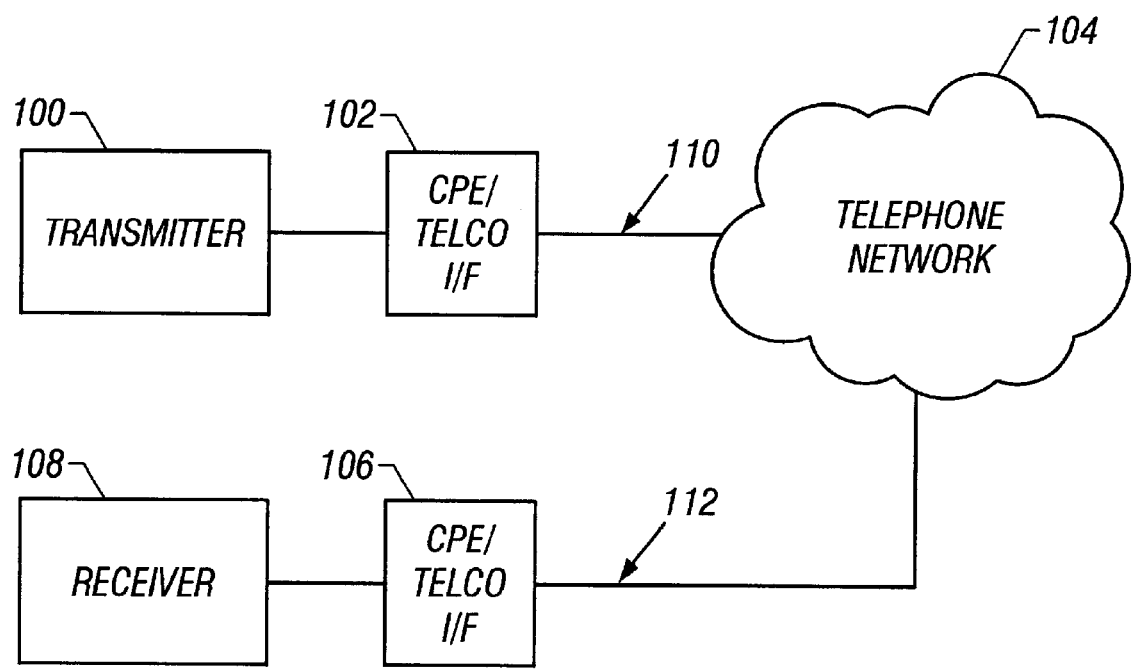
FIG. 1 is a block diagram of a transmitter and a receiver coupled to a Plain Old Telephone Service (POTS) network.

Turning now to the drawings, FIG. 1 is a block diagram of a transmitter and receiver coupled to a telephone network, such as Plain Old Telephone Service (POTS) network of a PSTN. A transmitter 100 is coupled to a Customer Premise Equipment/Telephone Company (CPE/TELCO) interface 102, such as a wall jack (e.g., an RJ-11 jack). The interface 102 generally represents the boundary between the customer and the TELCO. Various CPEs are connected to a TELCO central office switch (CO) (not shown). The CO is then coupled to a telephone network 104. A receiving end is also coupled to the telephone network 104 by its corresponding central office (not shown). An interface representing the boundary of the customer premise and TELCO is represented by an interface 106 that couples the CO and a CPE receiver 108. The transmitter 100 and receiver 108 can be communication devices, such as a stand-alone modem, a modem card in a computer, a telephone or a facsimile machine.

Telephone lines 110, 112 couple the CPE/TELCO interfaces 102, 106 with the telephone network 104. The telephone lines 110, 112 are generally referred to as a local loop. The telephone lines 110, 112 include tip and ring conductors for coupling the communication device to the telephone network 104. When the transmitter 100 or receiver 108 needs to access the telephone network, the transmitter 100 or receiver 108 goes to an "off-hook" state.

Figure 2:
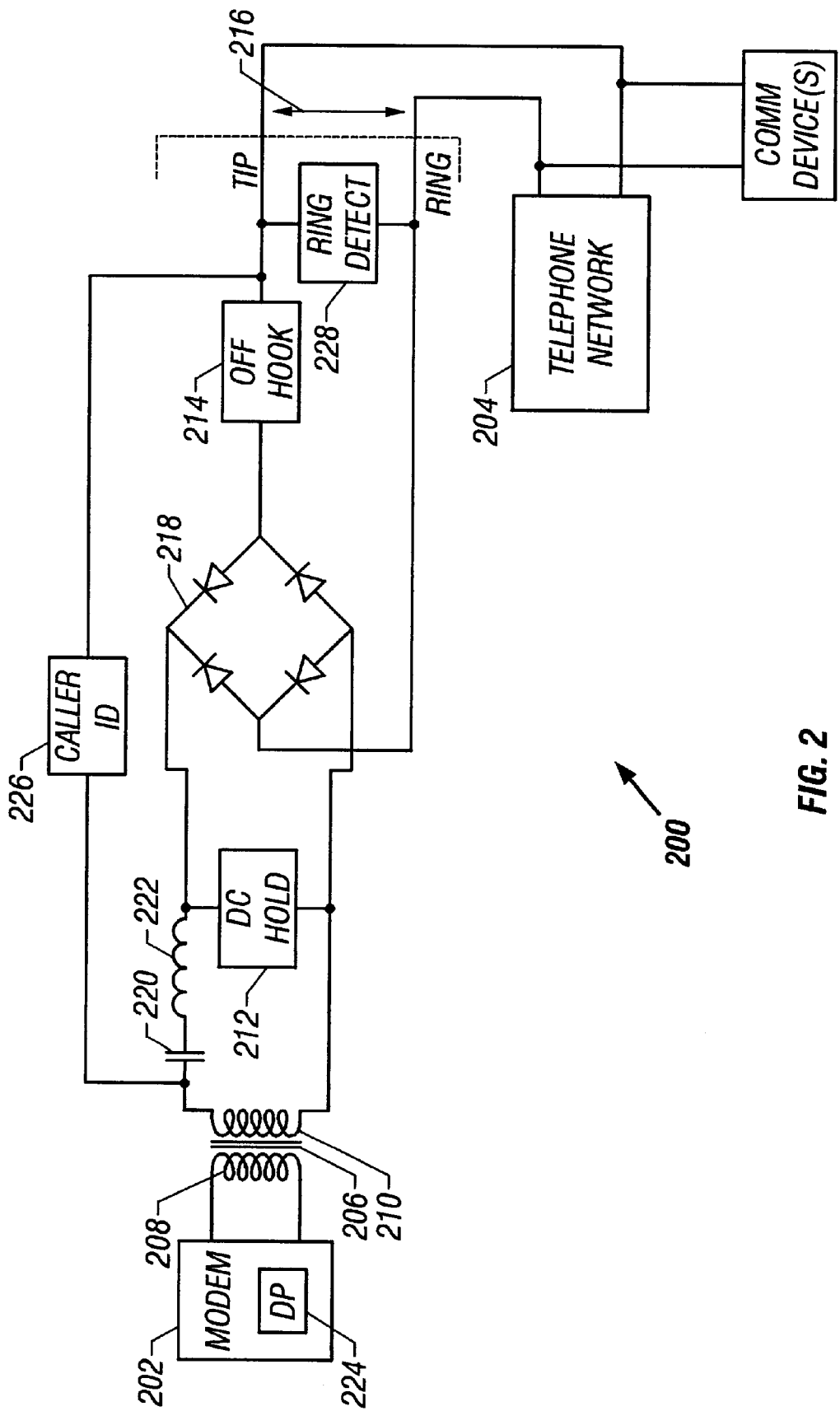
FIG. 2 is a block diagram of a modem and a Data Access Arrangement (DAA)

A data access arrangement (DAA) 200 in accordance with an embodiment of the present invention is indicated generally in FIG. 2. The DAA is typically incorporated into the modem. However, the DAA could be a stand-alone device. The DAA typically must adhere to FCC standards. Therefore, the DAA normally undergoes tests to determine if it complies with these standards. These tests are mandatory for DAAs that incorporate new hardware. The tests are typically not required for software/firmware changes. Therefore, it is desirable to incorporate software/firmware changes rather than hardware changes to the DAA design.

The DAA 200 includes circuitry associated with a modem 202 and its connection to telephone network lines 216, i.e., the tip and ring. The modem 202 includes a modem processor. The tip and ring are generally coupled to a telephone network 204, such as the PSTN, a PBX, etc. The modem 202 issues and receives control signals in accordance with various elements incorporated within the DAA 200. The modem 202 includes a data pump 204 for processing control signals. The data pump can be a processor, such as a digital signal processor. The data pump's 204 instructions and commands are generally controlled by software and or firmware, as in a program stored in a memory of the modem 202. The modem control signals are then issued in response to the incoming call or signals being processed. The control signals will vary in response to the detection by voice/data communication between the modem and the telephone network line.

The modem may comprise a stand-alone modem coupled to a PC across a serial communications port, such as an RS232 interface connector, or the like. Power to the modem may be provided externally through any conventional power source. The modem may also be connected internally within the PC.

A transformer 206 couples the modem to the DAA 200. Generally, the transformer ratio between transformer legs 208 and 210 is one-to-one. Consequently, the varying voltage and current levels across the transformer leg 210 are reflected in the transformer leg 208. The variable voltage representing the varying voice and modem signals can then be processed by the modem.

A DC holding circuit 212 is provided for holding, or maintaining, the DC loop current in an off-hook condition. The DC holding circuit 212 presents a low impedance to the DC current supplied by the telephone network's central office (not shown), and high impedance to the AC. Since an AC voltage must be presented to the modem while riding on the DC, a sufficient DC voltage must be maintained. Thus, the DC holding circuit 212 effectively clamps the DC voltage, preferably between 6–13 volts. The clamped voltage depends on the amount of current flowing through the circuit, and is affected by the distance to the central office. Preferably, such DC levels allow for AC signals of .+−0.3 volts to be superimposed on the DC without clipping.

An off-hook relay 214 is coupled between the DC holding circuit 212 and the telephone network line 216. When a modem function is activated, the off-hook relay 214 closes to connect the telephone network line 216 to the DC holding circuit 212. The amount of DC current flowing is generally dependent on the length of the modem to the central office. A modem signal can then be sent across the line, over the DC current. Thus, the DC level should be maintained at a particular amplitude. Concurrently, the DC holding circuit 212, while holding the DC current, should be transparent to the transmitted modem signal without contributing to distortion. When the off-hook relay 214 closes in response to a modem command which connects the modem 202 to the telephone network line 216, the DC holding circuit 212 is self-activating so that the modem can seize the line.

In a typical modem connection, the off-hook relay 214 closes when a telephone call is received and recognized by the modem. The off-hook relay 214 also closes for outgoing transmissions. As the polarity of the DC voltage on the telephone line is undetermined, a bridge rectifier 218 is provided to produce a DC voltage of known polarity to operate the DC holding circuit 212. Proper functioning of the DC holding circuit 212 can generally be achieved when the proper polarity is attained. As noted above, the DC resistance of the holding circuit 212 is necessarily very low, while the AC impedance is high to cause all of the AC signals between the local modem and a remote modem to pass through the transformer 206. Conversely, because the transformer 206 is easily saturated by the DC current, the AC signal is coupled to the transformer 126 through capacitor 220 to prevent DC current from flowing into the transformer 206. Furthermore, an inductor 222 generally prevents electromagnetic interference (EMI) from the modem 202 to the telephone network line 216.

In addition, the DAA 200 includes a caller ID circuit 226 coupled to the telephone line 216. Typically, an incoming call includes a caller's telephone number. The caller ID circuit 226 provides the caller's telephone number to the modem 202 for processing by a data pump 224. The processing of the caller's telephone number by the data pump 224 can occur prior to the modem going off-hook. The modem is effectively "listening" to the incoming call to determine the calling number. The data pump 224 can then decipher the telephone number of the calling party.

Furthermore the DAA 200 includes a ring detect circuit 228. The ring detect circuit 228 can provide a signal to the data pump 224 indicating when a ringing voltage is provided to the DAA 200 from the telephone network 216.

The described DAA 200 is typical, but a variety of other configurations are possible, whether for different countries or even in the same county. The particular DAA circuit used can be varied while still implementing off-hook detection.

Figure 3A:
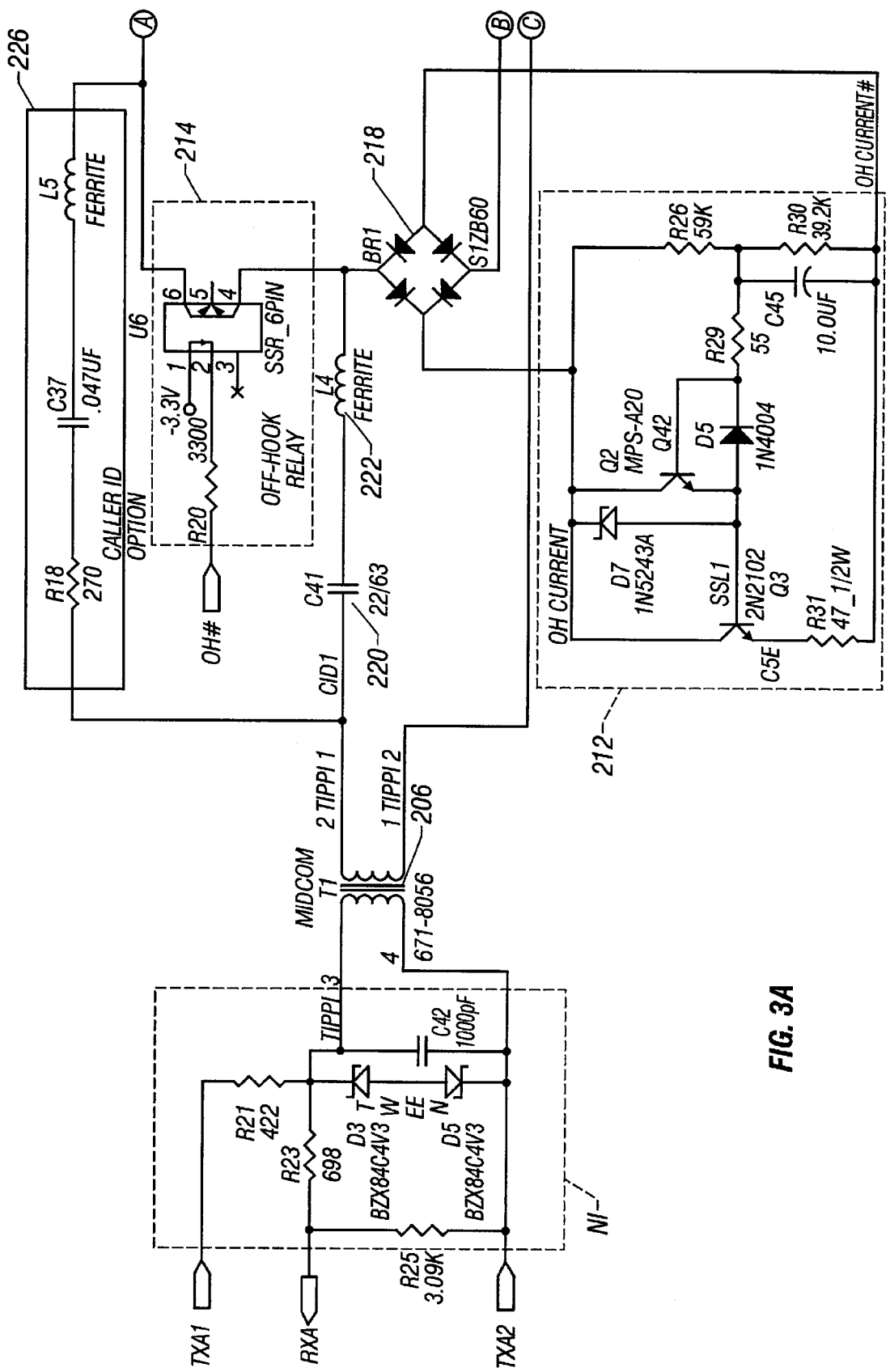
FIGS. 3A and 3B are circuit diagrams of a modem and a DAA.
Figure 3B:
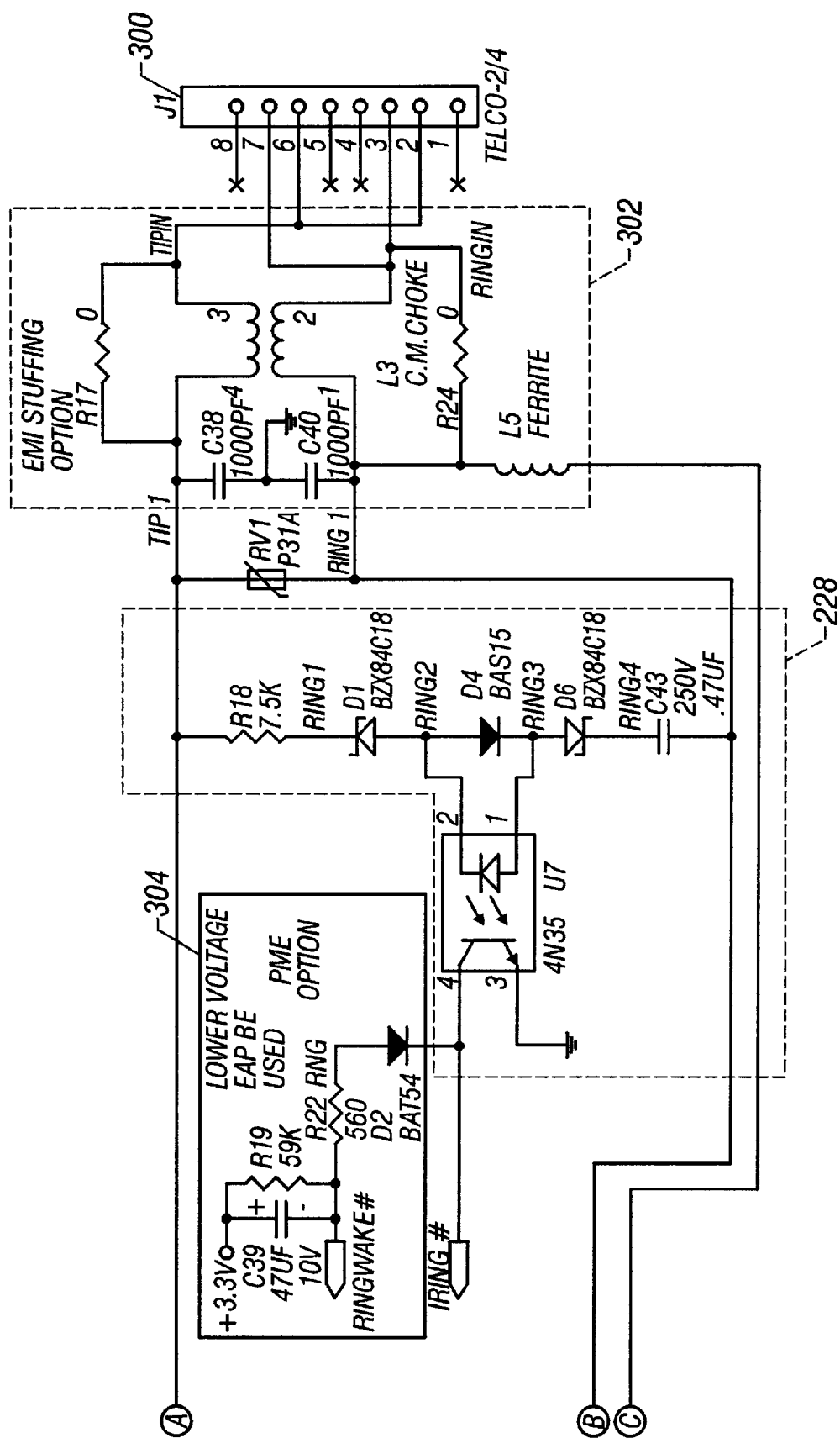

FIGS. 3A and 3B are circuit diagrams of an embodiment of the invention. Data and control signals to and from the data pump 224 are represented by an open arrow design. For example, TXA1 and TXA2 represent transmit data signals from the data pump 224 of the modem 202. The TXA1 and TXA2 data signals are provided to the telephone line 216 when the off-hook relay 214 is enabled. A control signal OH# from the data pump 224 enables the off-hook relay 214 that couples the modem to the telephone line 216. As previously discussed, the capacitor C220 is the DC blocking capacitor. The inductor 222 and EMI circuit 302 prevent harmful EMI from entering the telephone line 216. Typically in one embodiment, EMI circuit 302 includes inductors L3 and L5, capacitors C38, C40 and resistor R17 and R24. The inductor 222 and L5 are made of ferrite beads that provide a high impedance to signal frequencies outside of the frequency used by the modem.

The DC holding circuit is represented by elements included in the hashed lines of circuit 212. The DC holding circuit 212 includes transistors Q2 and Q3, diodes D7 and D8, capacitor C45 and resistors R28, R29 and R30. As previously discussed, the DC holding circuit 212 maintains a relatively constant DC voltage to the modem when the modem is off-hook. The four diodes 218 represents the rectifying bridge providing a known DC polarity from the telephone line 216 to the DC holding circuit 212.

The ring detect circuit 228 is represented by diodes D1, D4 and D6, capacitor C43, resistor R18 and coupler U7. If the telephone network 204 provides a ringing voltage to the DAA 200, an IRING# signal is provided to the data pump 224.

Next, a power management event circuit 304 is included in the DAA 200. Should a ringing voltage be provided by the telephone network 204, a RINGWAKE# signal is provided to the data pump 224. The RINGWAKE# signal can be used by the modem to inform other devices that a ring has occurred. Thus, the RINGWAKE# signal can inform the modem 202 to go to a higher power state.

In addition, a modem interface circuit N1 is shown in FIG. 3A. Resistors R21, R23 and R25 provide the necessary impedance matching for the modem 202 with the telephone line 216. Diodes D3 and D5, and capacitor C42 prevent harmful voltages from the telephone line 216 from damaging the modem 202. In addition, a fuse RV1 is provided to protect the DAA 200 from the telephone line 216. The DAA 200 is coupled to the telephone line 216 via TIPIN and RINGIN lines. These lines are coupled to a jack 300. The modem 202 is generally coupled to the telephone line 216 via the jack 300.

Last, the caller ID circuit 226 is represented by a resistor R16, a capacitor C37, and an inductor L6. The caller ID circuit 226 generally provides an AC path to the data pump 223 via an RXA signal line, regardless of whether the modem is on-hook or off-hook. An energy level from capacitor C37 can be monitored by the data pump 224 via the RXA signal line. Should other communication devices be transmitting on the telephone line 216, the AC signal from these transmissions can be monitored by the data pump 224. In another embodiment, should a communication device go to an off-hook state, the data pump 224 can detect the drop in the telephone line 216 voltage across the caller ID capacitor C37. A threshold energy level of capacitor C37 can be established. If the telephone line is not used by other communication devices, the energy level of capacitor C37 can be measured to establish a silence threshold. Should this threshold be exceeded, then the data pump 224 would consider this event to be a line in use state. Otherwise, if the energy level measured by the data pump 224 is below or at the silence threshold, then the data pump 224 would consider this event to be a line not in use state. Again, the circuit of FIGS. 3A and 3B are merely one embodiment, and other embodiments can implement the disclosed off-hook detection.

Figure 4:
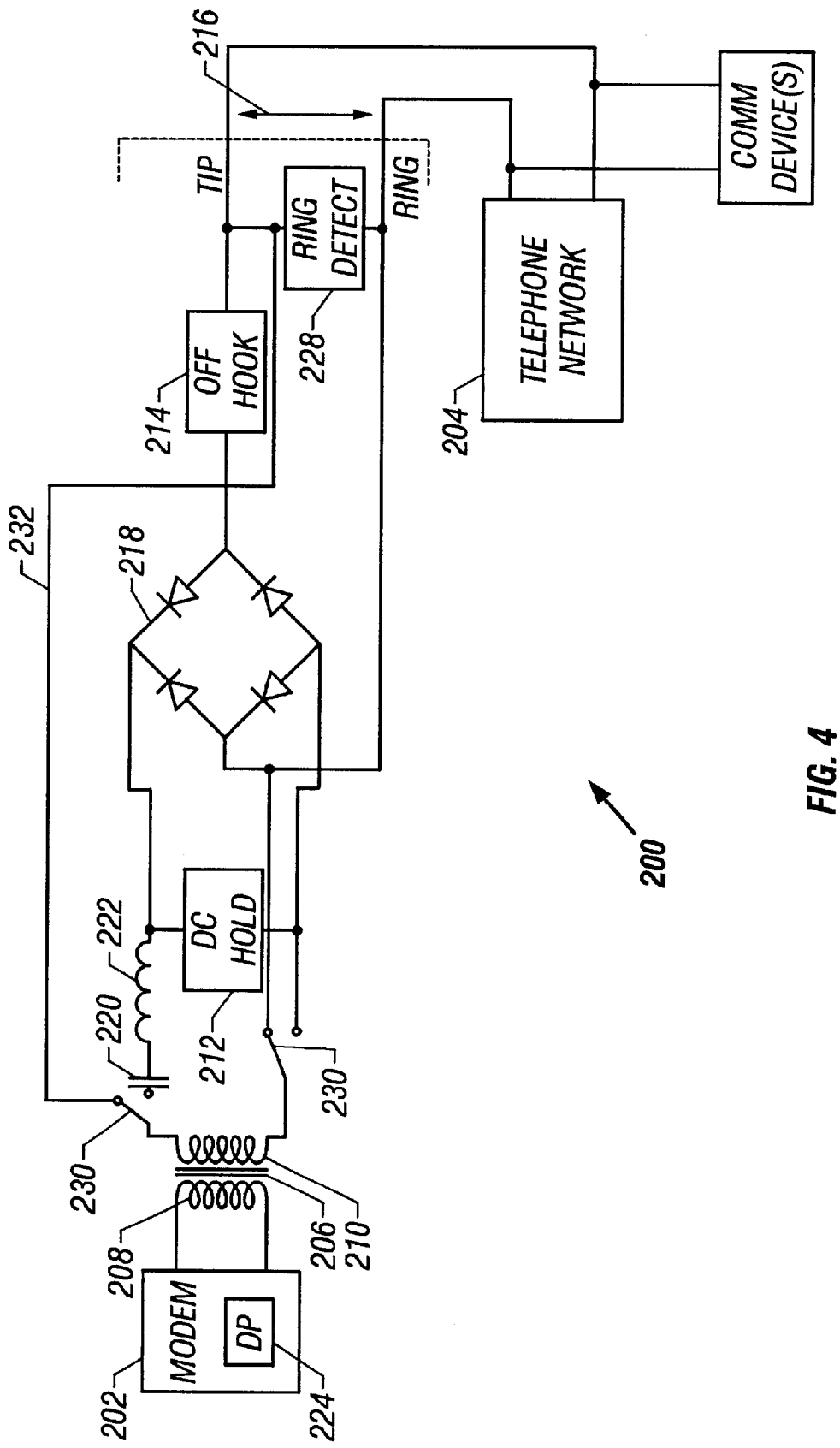
FIG. 4 is a block diagram of a modem and a DAA with a caller ID relay.

FIG. 4 is another embodiment of a modem and DAA using a caller ID relay. The circuit elements of FIG. 4 are similar to the circuit elements of FIGS. 3A and 3B, except for the addition of a caller ID relay 230. Typically, when the modem is in the on-hook state, the caller ID relay 220 provides a data path 232 between the telephone line 216 and the modem 202. Otherwise, with the modem is in the off-hook state, the data path 232 is not provided between the telephone line 216 and modem 202.

Therefore, when the modem 202 is in the on-hook state, the data pump 224 typically monitors the data path 232 for a signal representing a caller's telephone number. In addition, the data pump 224 can monitor the energy levels of the data path 232 to ascertain whether other devices are using the telephone line 216. When none of the other communication devices are using the telephone line 216, the data pump 224 can monitor the energy level of the data path 232 and set a threshold energy level that indicates that the line is not in use. Once a threshold level has been set, the data pump 224 can generally monitor the data path 232 to determine if the energy level of the data path 232 exceeds the threshold. If the data pump 224 measures an energy level of the data path above the threshold level, then the data pump 224 will determine that the telephone line 216 is in use. Otherwise, if the data pump 224 measures an energy level of the data path 232 below the threshold level, then the data pump 224 will determine that the telephone line 216 is not in use.

Furthermore, should other communication devices be coupled to the telephone 216, the data pump 224 can detect an energy profile level for the communication devices when they go off-hook and can match the energy profile with a known value in a database. For instance, another telephone (or extension) can be coupled to the telephone line 216. When the communication device goes off-hook, the communication device exhibits a certain energy profile. The data pump 224 can monitor the certain energy profile and determine that a particular communication device is using the telephone line 216 by matching the energy profile detected with an energy profile stored in a database. The data pump 224 can continue to monitor the data path 232. Should the energy level return to the threshold level, the data pump 224 can determine that the communication device has returned to the on-hook state and the telephone line 216 is not in use.

Figure 5:
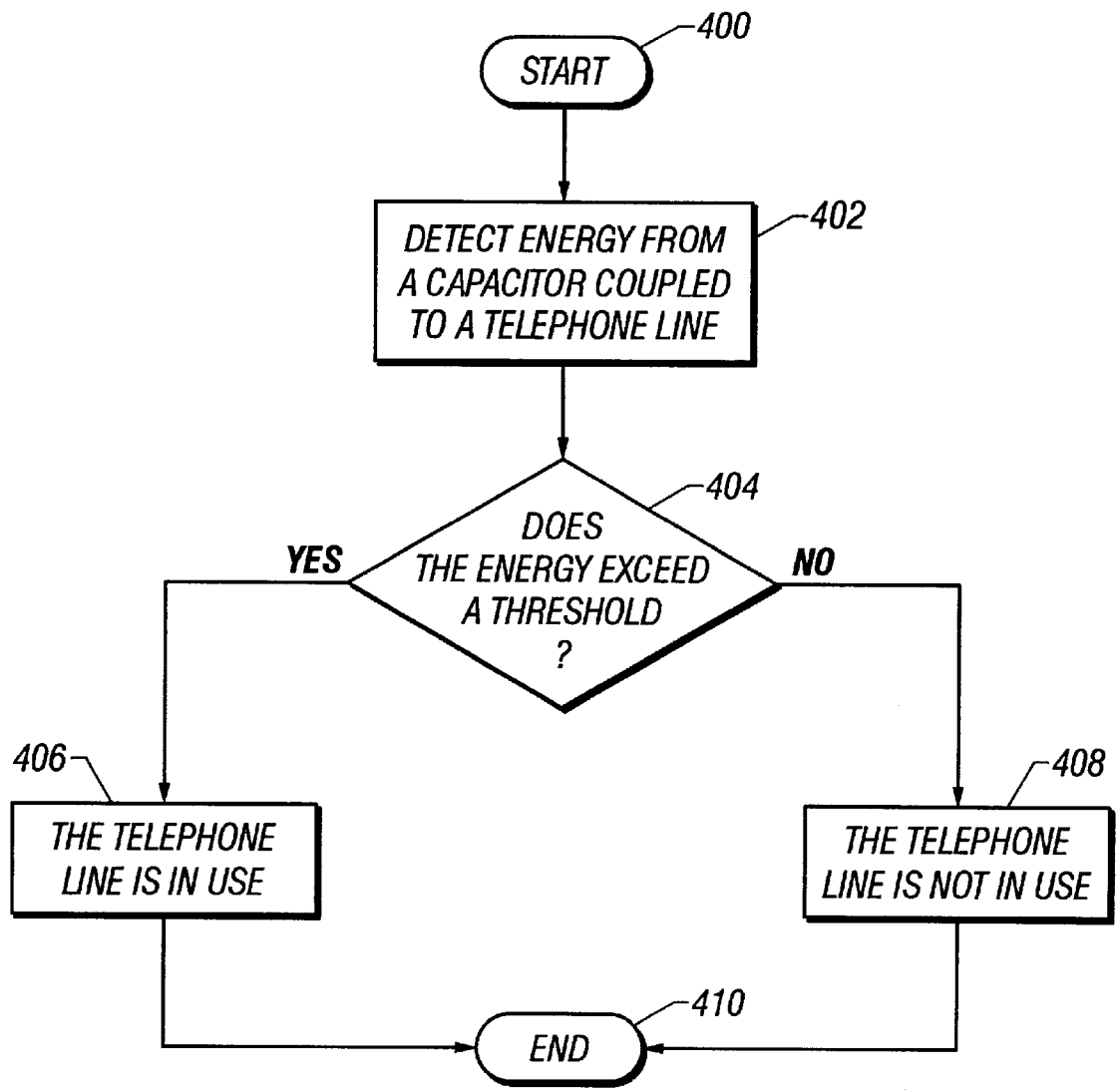
FIG. 5 is a flow chart of a method of detecting a status of a telephone line, such as using the diagrams of FIGS. 2, 3 and 4.

FIG. 5 is flow chart of a method of ascertaining a line status of a telephone line, such as by using the circuits of FIGS. 2, 3 and 4. The method starts at step 400. An energy from a capacitor coupled to the telephone line is measured at step 402. A determination of the energy measured is performed at step 404. At step 406, if the energy measured exceeds the threshold, then the telephone line is in use. At step 408, if the energy measured does not exceed the threshold, then the telephone line is not in use. The method ends at step 410.

Figure 6:
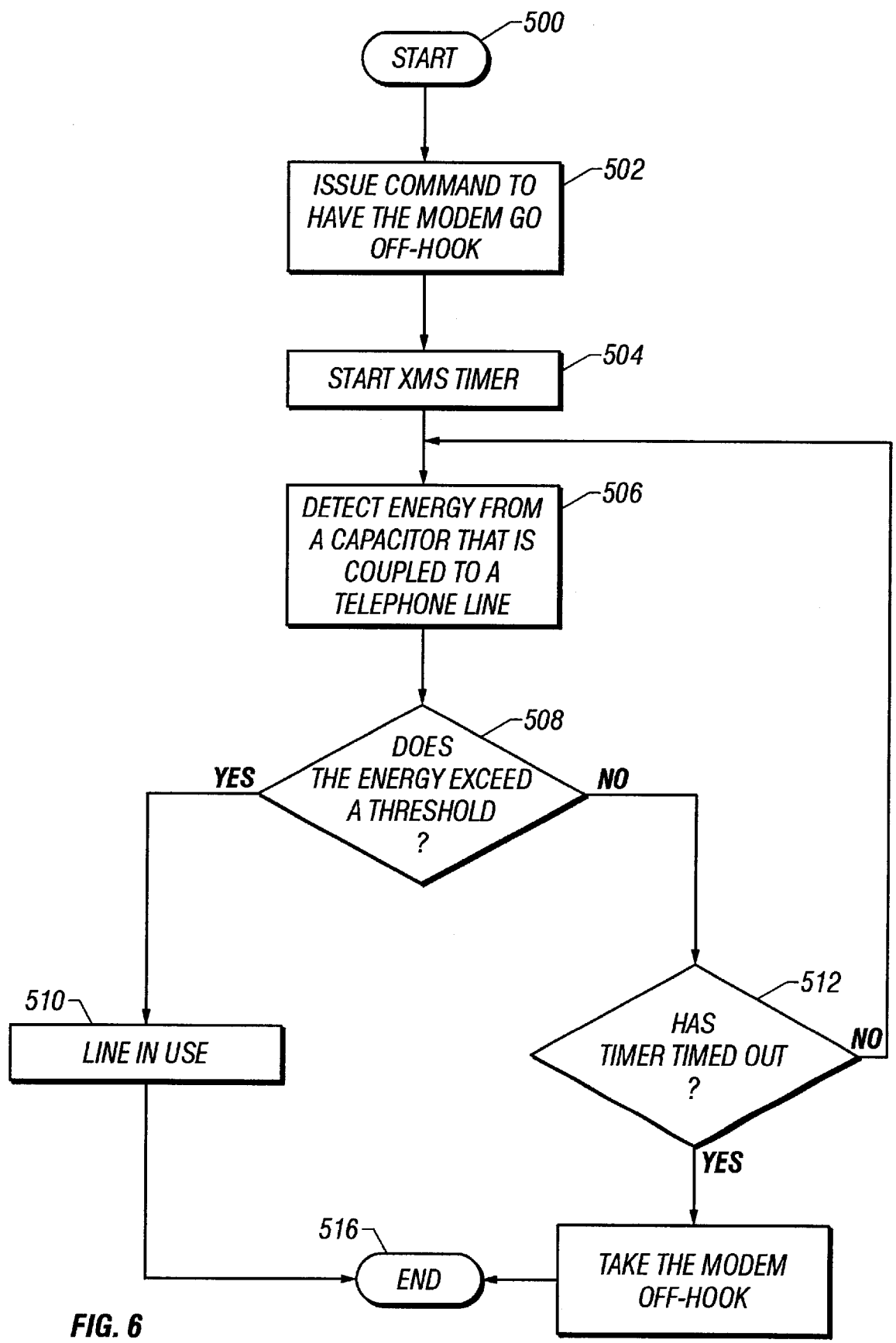
FIG. 6 is a flow chart of a method of detecting a status of a telephone line using a timer, such as using the diagrams of FIGS. 2, 3 and 4.

FIG. 6 is a flow chart of a method of taking a modem off-hook if a telephone line is not in use, such as by using the circuits of FIGS. 2, 3 and 4. The method starts at step 500. A command is issued to have a modem go off-hook at step 502. At step 504, an Xms timer is started to generally insure that the telephone line in not in use. At step 506, an energy from a capacitor that is coupled to a telephone line is measured. A decision is made at step 508 to determine if the energy exceeds a threshold. If the energy measured exceeds the threshold, then the modem reports that the telephone line is in use at step 510. The method ends at step 516. At step 508, if the decision is no, then the method proceeds to step 512. At step 512, a decision is made to determine whether the Xms timer has timed out. If the Xms timer has not timed out, then the method proceeds to step 506. If at step 512, the Xms timer has timed out, the modem is taken off-hook at step 514 and the method ends at step 516.

Figure 7:
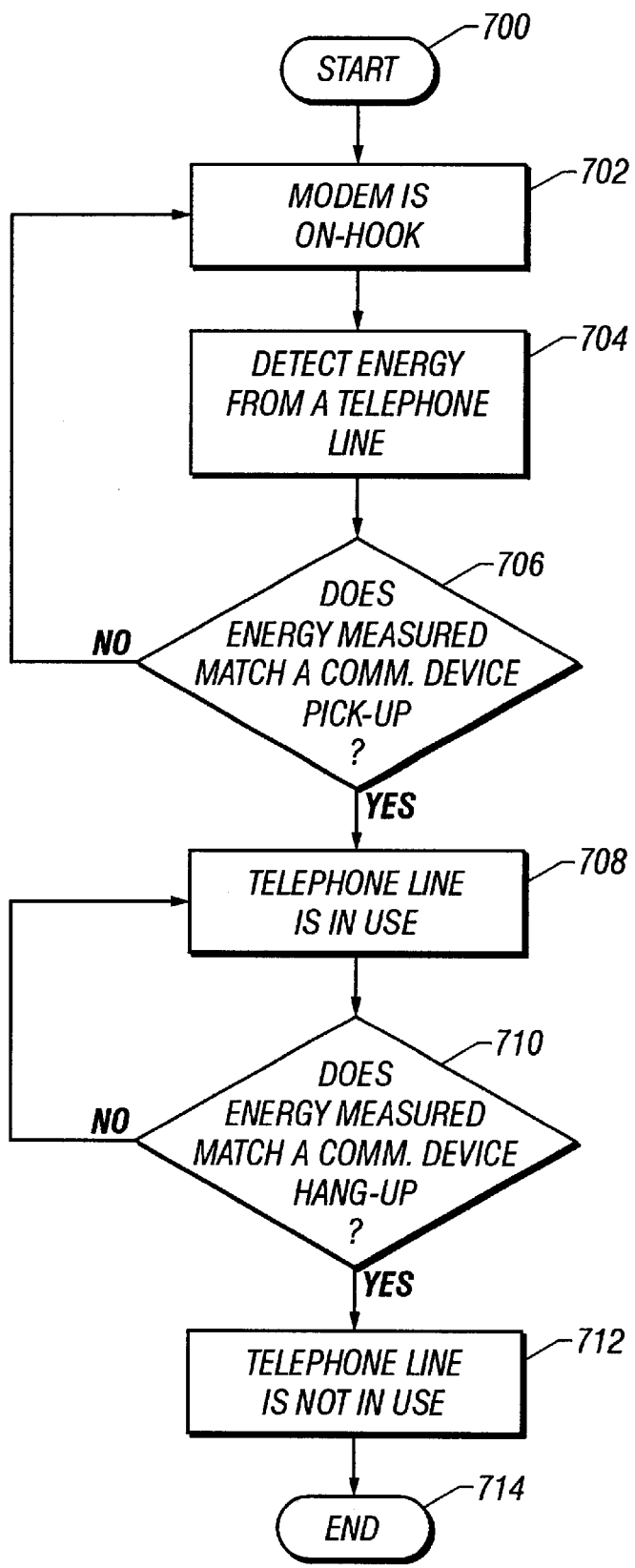
FIG. 7 is a flow chart of another method of detecting a status of a telephone line, such as using the diagrams of FIGS. 2, 3 and 4.

FIG. 7 is a flow chart of a method of detecting whether another communication device is using a telephone line; such as by using the circuits in FIGS. 2, 3 and 4. The method starts at step 700. At step 702, the modem is in an on-hook state. At step 704, a $1^{st}$ energy is detected from a telephone line. At step 706, a decision is made whether the $1^{st}$ energy detected by a data pump matches a $1^{st}$ energy profile. The $1^{st}$ energy profile can be an energy from a communication device that is coupled to the telephone line, such as another telephone extension, going off-hook. If the detected $1^{st}$ energy does not match the $1^{st}$ energy profile, then the method proceeds to step 702, wherein the modem is on-hook. If at step 706, the $1^{st}$ energy matches the $1^{st}$ energy profile, then the data pump reports that the line is in use at step 708. Next at step 710, if the data pump detects a $2^{nd}$ energy that matches a $2^{nd}$ energy profile, then the data pump reports that the line is not in use at step 712. The $2^{nd}$ energy profile can be an energy from a communication device that goes from an off-hook state to an on-hook state, although this method is not limited to this particular procedure. Otherwise, if the data pump detects a $2^{nd}$ energy that does not match the $2^{nd}$ energy profile, then the data pump reports that the line is in use at step 708. The method ends at step 712.

Figure 8:
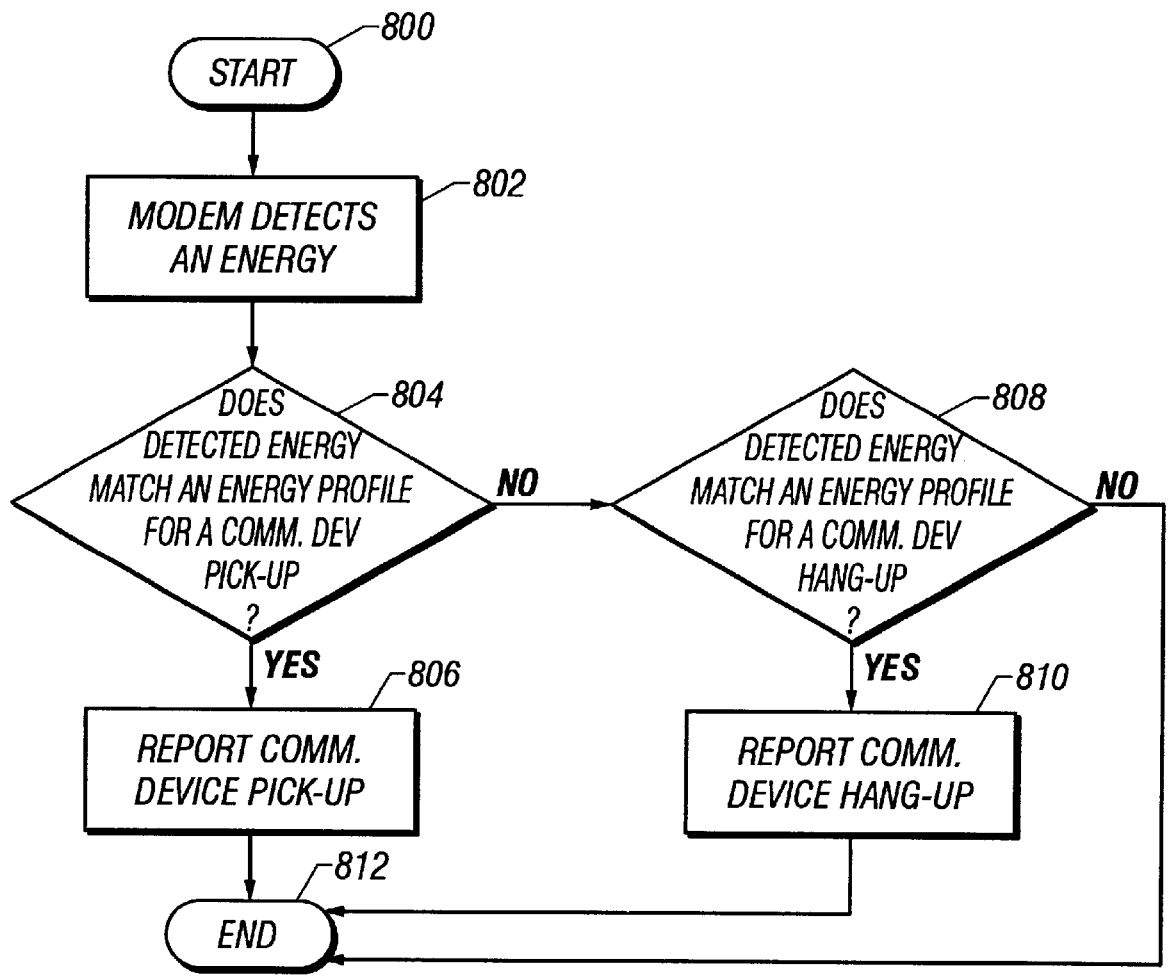
FIG. 8 is a flow chart of a method of detecting a pick-up or hang-up status of other communication devices on a telephone line, such as using the diagrams of FIGS. 2, 3 and 4.

FIG. 8 is a flow chart of a method determining the status of another communication device coupled to a shared telephone line, such as the circuits of FIGS. 2, 3 and 4. The method starts at step 800. The modem detects an energy from a telephone line that the modem shares with other communication devices, such as another telephone extension, at step 802. At step 804, if the modem determines that the detected energy matches an energy profile for the communication device pick-up, then the modem reports that the communication device has been picked-up at step 806 and the method ends at step 812. Otherwise, the method proceeds to step 808. At step 808, if the modem determines that the detected energy matches an energy profile for the communication device hang-up, then the modem reports that the communication device has hung up at step 810 and the method ends at step 812. Otherwise, if the modem determines that the detected energy does not match an energy profile for the communication device hang-up, the method ends at step 812.

As mentioned previously, the disclosed line status detection techniques can be implemented in communication devices that have a energy storage device such as a capacitor, or a caller ID relay that is coupled to a telephone line. The technique provides a elegant way of determining the status of a telephone line without the addition of hardware.

The foregoing disclosure and description of the invention are illustrative and explanatory thereof, and various changes in the size, shape, materials, components, circuit elements, wiring connections and contacts, as well as in the details of the illustrative circuitry and construction and method of operation may be made without departing from the spirit of the invention.

We claim:

1. An apparatus for providing a state of a telephone line, comprising:

an interface coupled to the telephone network, the interface comprising an energy storage element that is coupled to the telephone line; and a communication device coupled to the energy storage element, wherein the communication device ascertains a measured energy stored in the energy storage element to determine the state of the telephone line, wherein the energy storage element is employed by another circuit providing other functionality, and wherein the other circuit is a caller ID circuit.

2. An apparatus for providing a state of a telephone line, comprising:

an interface coupled to the telephone network, the interface comprising an energy storage element that is coupled to the telephone line; and a communication device coupled to the energy storage element, wherein the communication device ascertains a measured energy stored in the energy storage element to determine the state of the telephone line, wherein the state of the telephone line is in use when the measured energy exceeds a threshold.

3. An apparatus for providing a state of a telephone line, comprising:

an interface coupled to the telephone network, the interface comprising an energy storage element that is coupled to the telephone line; and a communication device coupled to the energy storage element, wherein the communication device ascertains a measured energy stored in the energy storage element to determine the state of the telephone line, wherein the state of the telephone line is not in use when the measured energy does not exceed a threshold.

4. An apparatus for providing a state of a telephone line, comprising:

an interface coupled to the telephone network, the interface comprising an energy storage element that is coupled to the telephone line;

a communication device coupled to the energy storage element, wherein the communication device ascertains a measured energy stored in the energy storage element to determine the state of the telephone line; and an off-hook circuit that is coupled between the modem and the telephone line, wherein the telephone line is a plain old telephone service (POTS) line, and wherein a state of the telephone line is not in use when the measured energy does not exceed a threshold.

5. An apparatus for providing a state of a telephone line, comprising:

an interface coupled to the telephone network, the interface comprising an energy storage element that is coupled to the telephone line;

a communication device coupled to the energy storage element, wherein the communication device ascertains a measured energy stored in the energy storage element to determine the state of the telephone line; and an off-hook circuit that is coupled between the modem and the telephone line, wherein the telephone line is a plain old telephone service (POTS) line, and wherein the state of the telephone line is in use when the measured energy exceeds a threshold.

6. A method of providing a state of a telephone line, comprising the steps of:

measuring a energy of a energy storage element coupled to the telephone line;

ascertaining whether the energy exceeds a threshold; and determining that the telephone line is in use if the energy exceeds the threshold, or determining that the telephone line is not in use if the energy does not exceed the threshold.

7. The method of claim 6, wherein the energy storage element is a capacitor.

8. The method of claim 7, further comprising the step of:

employing the capacity for caller ID.

9. The method of claim 6, wherein the telephone line is a POTS line.

10. A method of a modem going to an off-hook state if a telephone line is not in use, comprising the steps of:

measuring a energy of a energy storage element serially coupled to the telephone line;

ascertaining whether the energy exceeds a threshold:

taking the modem off-hook if the energy does not exceed the threshold;

continuing to measure the energy of the energy storage element for a period x if the energy exceeds the threshold.

11. The method of claim 10, wherein the energy storage element is a capacitor.

12. The method of claim of claim 11, further comprising the step of:

employing the capacitor for caller ID.

13. The method of claim 10, wherein the telephone line is a POTS line.

* * * * *